March 31, 1970        R. HAASE        3,503,337
ACCUMULATING CONVEYOR SYSTEM
Filed May 29, 1967        2 Sheets-Sheet 1
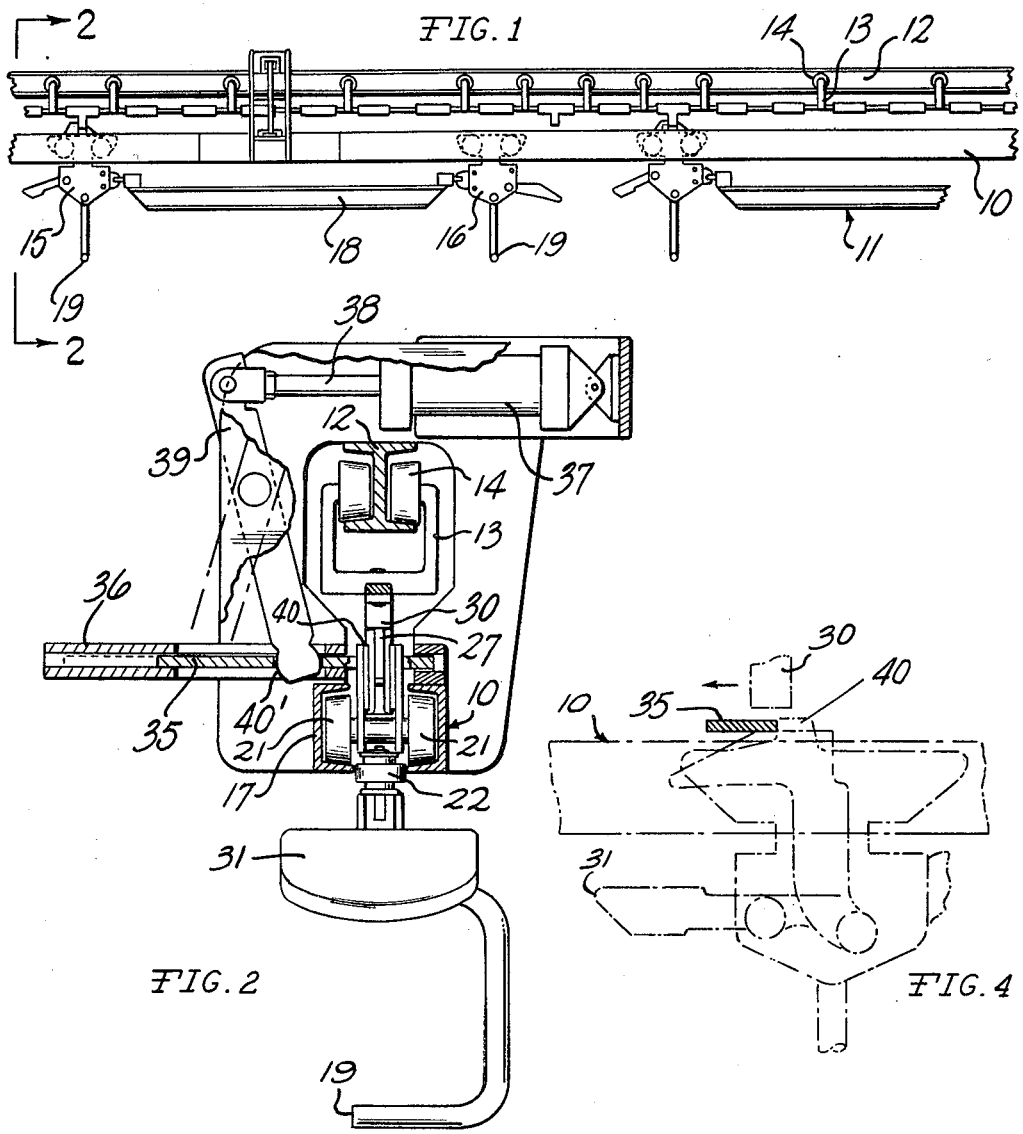
INVENTOR
ROBERT HAASE
BY
ATTORNEYS

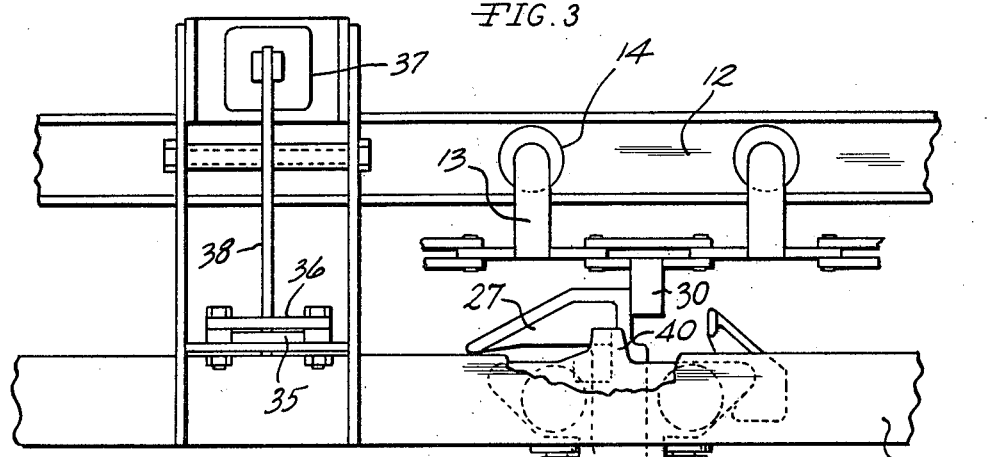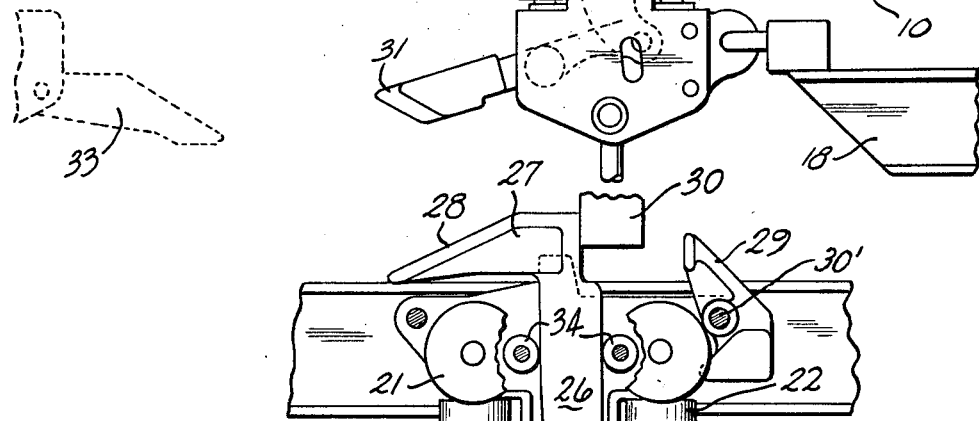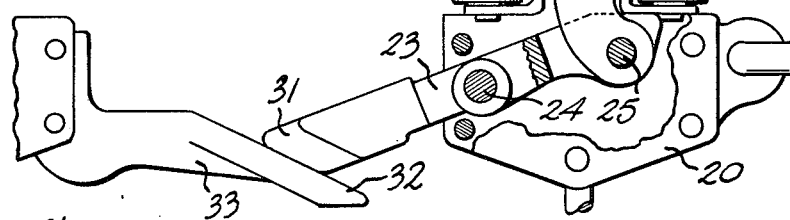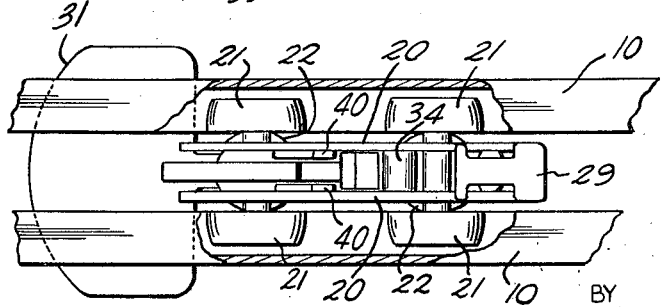

United States Patent Office 3,503,337
Patented Mar. 31, 1970

3,503,337
ACCUMULATING CONVEYOR SYSTEM
Robert Haase, Troy, Mich., assignor, by mesne assignments, to American Chain & Cable Company, Inc., New York, N.Y., a corporation of New York
Filed May 29, 1967, Ser. No. 642,107
Int. Cl. B61b 13/00
U.S. Cl. 104—172                    10 Claims

ABSTRACT OF THE DISCLOSURE

The accumulating power and free conveyor system disclosed herein comprises a main track along which carriers are movable and a conveyor track along which a carrier chain is movable, the two tracks being substantially uniformly spaced throughout the zone to which the present invention prefers. Each carrier is provided with a movable pusher dog and the conveyor chain is provided with pusher lugs that engage the pusher dogs to move the carriers along the track. A stop member is provided along the track and is movable into position for engaging the pusher dog on the carrier to hold it out of the path of the pusher lugs on the conveyor chain. The stop member engages the body of the carrier to prevent inadvertent movement of the carrier along the track. The pusher dog is interconnected with an accumulating lever on the carrier which engages a preceding carrier or an obstacle to move the pusher dog out of the path of the pusher lug in the event that an obstacle or a preceding carrier is encountered.

---

This invention relates to power and free conveyor systems and particularly to accumulating power and free conveyor systems.

BACKGROUND OF THE INVENTION

In power and free conveyor systems, it is common to provide a main track along which a plurality of carriers are movable and a conveyor or chain track along which a chain is moved. The carriers commonly have a depressible pusher dog which is engaged by a pusher lug on the conveyor chain to move the carriers along the track. Where it is desired to stop the movement of the carriers, for example to perform an operation on the articles supported by the carriers or to accommodate the operations in a production line, it has heretofore been common to increase the spacing between the main track and the conveyor chain track and to provide a stop member that is movable into position at the point of increased spacing to depress the pusher dog and hold the pusher dog out of the path of the pusher lug of the conveyor chain. Such an arrangement is shown for example in the copending application of Leonard J. Bishop, Ser. No. 588,175, filed Oct. 20, 1966, now Patent No. 3,437,054 and having a common assignee with the present application. Although such a system is quite successful, occasionally because of the nature of the load being supported by the carrier, it is possible that inadvertently the carrier will move past the stop member.

Among the objects of the present invention are to provide a power and free conveyor system which obviates the aforementioned difficulties in the prior art, which utilizes a uniform spacing between the main track and the conveyor chain track, which positively stops the movement of the carrier, and which is simple and low in cost.

SUMMARY

The accumulating power and free conveyor system disclosed herein comprises a main track along which carriers are movable and a conveyor track along which a carrier chain is movable, the two tracks being substantially uniformly spaced throughout the zone to which the present invention refers. Each carrier is provided with a movable pusher dog and the conveyor chain is provided with pusher lugs that engage the pusher dogs to move the carriers along the track. A stop member is provided along the track and is movable into position for engaging the pusher dog on the carrier to hold it out of the path of the pusher lug on the conveyor chain. The stop member engages the body of the carrier to prevent inadvertent movement of the carrier along the track. The pusher dog is interconnected with an accumulating lever on the carrier which engages a preceding carrier or an obstacle to move the pusher dog out of the path of the pusher lug in the event that an obstacle or a preceding carrier is encountered.

DESCRIPTION OF THE DRAWINGS

FIG. 1 is a partly diagrammatic fragmentary elevational view of a conveyor system embodying the invention.

FIG. 2 is a fragmentary part sectional view on an enlarged scale taken along the line 2—2 in FIG. 1.

FIG. 3 is a fragmentary part sectional view on an enlarged scale of a portion of the system shown in FIG. 1, showing the parts in different operative position.

FIG. 4 is a partly diagrammatic view similar to FIG. 3 showing the parts in a different operative position.

FIG. 5 is a part sectional fragmentary view on an enlarged scale of a portion of the apparatus shown in FIG. 3 with the parts in a different operative position.

FIG. 6 is a part sectional plan view of a portion of the apparatus shown in FIG. 5.

DESCRIPTION

Referring to FIG. 1, the conveyor systems embodying the invention is of the power and free conveyor type and comprises a main track 10 along which carriers 11 are movable and a conveyor chain track 12 along which a conveyor chain 13 supported by chain trolleys 14 is movable and driven by power means not shown. Each carrier 11 comprises wheeled trolleys 15, 16 that are supported within the channels 17 of the main track 10 and an interconnecting tie bar 18 pivotally interconecting the trolleys 15, 16. The load carried by the carriers is supported by hooks 19 extending downwardly from the trolleys 15, 16.

As shown in FIG. 5, the front trolley 15 comprises a body formed by spaced plates 20 upon which wheels 21 are provided for engaging the track. Rollers 22 extend between the flanges of the track for laterally stabilizing the trolley. An accumulating lever 23 is pivoted by a pin 24 on the body and has its rear end, in turn, pivoted by a pin 25 to the lower end 26 of a pusher dog 27 that has an upwardly and rearwardly inclined front surface 28. A hold back dog 29 is pivoted on the body by a pin 30' and is counterweighted so that it normally is in the upright position as shown in FIG. 5. Conveyor chain 13 is provided with a plurality of downwardly extending pusher lugs 30 that are adapted to engage the pusher dogs 27 to move the carriers along the track. The forward end of the accumulating lever 23 is enlarged as at 31 and is adapted to engage an inclined surface 32 on a bracket 33 of the rear trolley of an obstacle or a preceding carrier to move the accumulating lever to the broken line position shown in FIG. 5 and thereby lower the pusher dog 27 out of the path of the pusher lug 30. Guide rollers 34 are provided between the plate 20 of the forward trolley to guide the vertical movement of the pusher dog 27.

Further, in accordance with the invention, a stop plate 35 is supported in a guide bracket 36 for movement transversely across the path of the pusher dogs 27 to depress the pusher dogs out of the path of the pusher lugs 30. As shown, a fluid motor 37 has a shaft 38 pivoted to the upper end of an operating rod 39, the lower end of which extends into an opening 40' in the stop plate 35 so that when the motor is actuated, the stop plate 35 is moved into and out of pusher dog depressing position. The stop mechanism is more specifically shown and described in the aforementioned patent application of Bishop, Ser. No. 588,175.

As further shown in FIG. 3, in accordance with the invention, the plates 20 that form the body of the trolley 15 have upwardly extending projections 40 that extend to a distance wherein they will engage the stop plate 35 but will be below and clear of the pusher lugs 30.

Thus when it is desired to interrupt the movement of the carrier, the stop plate 35 is moved into the path of the carrier to a position where it will depress the pusher dog 27 out of the path of the pusher lug 30 as shown in FIG. 4. In this position, the stop plate 35 will engage the projections 40 and prevent inadvertent forward movement of the carrier past the stop plate.

When stop plate 35 is retracted, the weight of accumulating lever will force pusher dog 27 upwardly into the path of a succeeding pusher lug 30.

I claim:
1. In a conveyor system, the combination comprising:
a main track,
a plurality of carriers movable along said main track,
a conveyor track,
a conveyor movable along said conveyor track,
each said carrier having a body and a movable pusher dog,
said conveyor having a pusher lug adapted to engage said pusher dog,
a stop member mounted along said conveyor and adapted to be moved into and out of position for engaging and moving a pusher dog out of the path of the pusher lug,
said stop member when in position for engaging said pusher lug being positioned below the path of the pusher lug but in the path of a fixed portion of the body of the carrier whereby the carrier is engaged and prevented from further movement along the track.

2. The combination set forth in claim 1 wherein said stop member is movable in a straight line transversely across the path of the carriers.

3. The combination set forth in claim 1 wherein said stop member engages the upper portion of the body of the carrier.

4. The combination set forth in claim 1 wherein said pusher dog of said carrier is interconnected with an accumulating lever that is operable upon engagement of the carrier with a preceding carrier or an obstacle to move the pusher dog out of position and out of the path of the pusher lug on the conveyor chain.

5. The combination set forth in claim 1 including a movable hold back dog on said carrier operable to entrap the pusher lug between the pusher dog and the hold back dog.

6. In a conveyor system, the combination comprising:
a main track,
a plurality of carriers movable along said main track,
a conveyor track,
a conveyor movable along said conveyor track,
said main track and conveyor track being uniformly spaced relative to one another,
each said carrier having a body and an upwardly extending movable pusher dog,
said conveyor having a plurality of downwardly extending pusher lugs adapted to engage said pusher dogs,
a stop member mounted along said conveyor and adapted to be moved into and out of position for engaging and moving a pusher dog out of the path of a pusher lug,
said stop member when in position for engaging said pusher dog being positioned below the path of the pusher lug but in the path of an upper fixed portion of the body of the carrier whereby the carrier is engaged and prevented from further movement along the track.

7. The combination set forth in claim 6 wherein said stop member is movable in a straight line transversely across the path of the carriers.

8. The combination set forth in claim 6 wherein said stop member engages a projection on the upper portion of the carrier, said projection being below the path of said pusher lugs.

9. The combination set forth in claim 6 wherein said pusher dog of said carrier is interconnected with an accumulating lever that is operable upon engagement of the carrier with a preceding carrier or an obstacle to move the pusher dog out of position and out of the path of the pusher lug on the conveyor chain.

10. The combination set forth in claim 6 including a movable hold back dog on said carrier operable to entrap the pusher lug between the pusher dog and the hold back dog.

References Cited
UNITED STATES PATENTS 3,229,645    1/1956    Dehne _____ 104—172

JAMES B. MARBERT, Primary Examiner